(12) United States Patent
Byrne

(10) Patent No.: US 11,356,272 B2
(45) Date of Patent: *Jun. 7, 2022

(54) METHODS AND DEVICES FOR HANDLING HASH-TREE BASED DATA SIGNATURES

(71) Applicant: Telefonaktiebolaget LM Ericsson (publ), Stockholm (SE)

(72) Inventor: Robert Byrne, Melbourne (AU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 252 days.

This patent is subject to a terminal disclaimer.

(21) Appl. No.: 16/098,489

(22) PCT Filed: May 19, 2016

(86) PCT No.: PCT/SE2016/050453
§ 371 (c)(1),
(2) Date: Nov. 2, 2018

(87) PCT Pub. No.: WO2017/200438
PCT Pub. Date: Nov. 23, 2017

(65) Prior Publication Data
US 2019/0149338 A1 May 16, 2019

(51) Int. Cl.
*H04L 29/06* (2006.01)
*H04L 9/32* (2006.01)
*G06F 21/64* (2013.01)
*H04L 9/40* (2022.01)

(52) U.S. Cl.
CPC ............ *H04L 9/3247* (2013.01); *G06F 21/64* (2013.01); *H04L 9/3239* (2013.01); *H04L 63/029* (2013.01)

(58) Field of Classification Search
CPC ... H04L 9/3247; H04L 9/3239; H04L 63/029; G06F 21/64
See application file for complete search history.

(56) References Cited

U.S. PATENT DOCUMENTS

2002/0188850 A1* 12/2002 Naccache ............. H04L 9/3249
713/176
2013/0227209 A1    8/2013 Czerkowicz et al.
(Continued)

FOREIGN PATENT DOCUMENTS

EP          1235135 A2     8/2002

OTHER PUBLICATIONS

Buldas, A. et al., "Keyless Signatures' Infrastructure: How to Build Global Distributed Hash-Trees," Network and Parallel Computing, Oct. 18, 2013, pp. 1-9, Springer International Publishing.

*Primary Examiner* — Wasika Nipa
(74) *Attorney, Agent, or Firm* — Christopher & Weisberg, P.A.

(57) ABSTRACT

A method (30) of handling a hash-tree based data signature is described. The method (30) is performed in a client device (12) and comprises receiving (32), from a gateway device (13), a hash-tree based data signature, and determining (33), based on the received hash-tree based data signature, a first partial signature, P I. A method (60) in a gateway device (13) is also described. A corresponding client device (12) and gateway device (13) are also disclosed, as are related computer programs and computer program products.

10 Claims, 7 Drawing Sheets

(56) References Cited

U.S. PATENT DOCUMENTS

| | | | | |
|---|---|---|---|---|
| 2013/0276074 A1* | 10/2013 | Orsini | ............ | H04L 9/085 |
| | | | | 726/5 |
| 2014/0245020 A1* | 8/2014 | Buldas | ............ | H04L 9/3257 |
| | | | | 713/177 |
| 2016/0080146 A1* | 3/2016 | Gauravaram | ...... | H04L 9/0869 |
| | | | | 380/46 |
| 2017/0004168 A1* | 1/2017 | Hakala | ............ | H04L 9/007 |
| 2017/0078101 A1* | 3/2017 | Maximov | ............ | H04L 9/3242 |

* cited by examiner

METHODS AND DEVICES FOR HANDLING HASH-TREE BASED DATA SIGNATURES

TECHNICAL FIELD

The technology disclosed herein relates generally to the field of data integrity protection, and in particular to methods and devices for handling hash-tree based data signatures.

BACKGROUND

Keyless Signature Infrastructure (KSI) is a hash-tree based data signing technology providing data integrity, time stamping and signer identification services. The KSI based signature technology provides an alternative solution to traditional data integrity protection systems and provides reliable integrity proof without assuming continued secrecy of keys. The KSI technology utilizes data hashes and hash trees for generating signature tokens for data to be integrity protected. Whenever there is a need to protect integrity of large volumes of data and/or when integrity protection of data is required for extended periods of time, KSI has advantages compared to traditional data integrity protection technology, e.g. Public Key Infrastructure (PKI) based data signing technology wherein public-private key pairs are used. For integrity protection of data sets that are so large that traditional data processing applications are inadequate due to storage restrictions (i.e. true "Big Data" volumes), KSI technology suits better than PKI technology.

KSI technology is an excellent choice for integrity protection in, for instance, a machine-to-machine environment (e.g. smart-metering) and an Internet of Things (IoT) environment. A device wishing to use a KSI service needs to have an interface towards the KSI service for sending data signing requests and verification requests. The device combines the data to be protected and a KSI signature, and therefore needs to store the KSI signatures; hence, this requires that the device has large enough storage capacity. The typical size of a KSI signature is more than 3 kilobytes, with a maximum size potentially exceeding 5 kilobytes (kBs). The storage capacity becomes an issue in particular when a device that generates significant amounts of data that mandates continuous integrity protection via the KSI service. For example, an average of 1000 KSI signatures generated per 24 hour may require more than 3 megabytes (MBs) data storage for the KSI signatures only.

However, such devices have typically limited amount of data storage capacity and simply extending its storage capacity is not always feasible, e.g. for cost reasons or simply due to lack of space due to device limitations. Further, if increasing the data storage capacity in the device, the retrieval of the signatures therefrom upon need would be burdensome for the owner, since a large amount of signatures will have to be retrieved from a large amount of devices.

Furthermore, the bandwidth of the communication link that is used has to be capable of carrying data amounts needed by the signature transfer without jeopardizing transfer of other traffic to and from the device. Smart devices, for instance, may have access to a network via a radio interface, e.g. Global System for Mobile Communications (GSM) or Wideband Code Division Multiple Access (WCMDA). Such radio interface of the smart device may not have been dimensioned for transmitting packets of the size required for the signature transfer, while also transmitting data.

The number of connected devices is growing exponentially and with such an increasing amount of machine-generated data, there is a need for scalable solutions that can provide proof of tamper- and corruption-free operation.

SUMMARY

An objective of the present disclosure is to address and improve various aspects for hash-tree based technologies such as the above described KSI technology. A particular objective is to enable storage-efficient handling of signatures while also ensuring high data integrity protection. This objective and others are achieved by the methods, devices, computer programs and computer program products according to the appended independent claims, and by the embodiments according to the dependent claims.

The objective is according to an aspect achieved by a method of handling a hash-tree based data signature. The method is performed in a client device and comprises receiving, from a gateway device, a hash-tree based data signature, and determining, based on the received hash-tree based data signature, a first partial signature.

The method provides a number of advantages. For instance, since part of the signature is stored outside the device (e.g. a smart device), the device is alleviated from the requirement of a large storage capacity which is a cost efficient solution for the device owner. Further, since part of the signature is stored within the device, i.e. the device has part of the secret, and the remaining part may be stored elsewhere, e.g. in a KSI network, protection against unauthorized tampering is provided. Still further, the method enables the data signature service (e.g. KSI service) provider to offer improved services to its users. For instance, by using only part of a signature a more efficient radio communication is offered to the service user.

The objective is according to an aspect achieved by a computer program for a client device for handling a hash-tree based data signature. The computer program comprises computer program code, which, when executed on at least one processor on the client device causes the client device to perform the method as above.

The objective is according to an aspect achieved by a computer program product comprising a computer program as above and a computer readable means on which the computer program is stored.

The objective is according to an aspect achieved by a client device for handling a hash-tree based data signature. The client device is configured to receive, from a gateway device, a hash-tree based data signature, and determine, based on the received hash-tree based data signature, a first partial signature.

The objective is according to an aspect achieved by a method of handling a hash-tree based data signature. The method is performed in a gateway device and comprises sending, to a client device, a hash-tree based data signature, and determining, based on the hash-tree based data signature, a second partial signature.

The objective is according to an aspect achieved by a computer program for a gateway device for handling a hash-tree based data signature. The computer program comprises computer program code, which, when executed on at least one processor on the gateway device causes the gateway device to perform the method as above.

The objective is according to an aspect achieved by a computer program product comprising a computer program as above and a computer readable means on which the computer program is stored.

The objective is according to an aspect achieved by a gateway device for handling a hash-tree based data signature. The gateway device is configured to send, to a client device, a hash-tree based data signature, and determine, based on the hash-tree based data signature, a second partial signature.

Further features and advantages of the embodiments of the present teachings will become clear upon reading the following description and the accompanying drawings.

DETAILED DESCRIPTION

Figure 1:
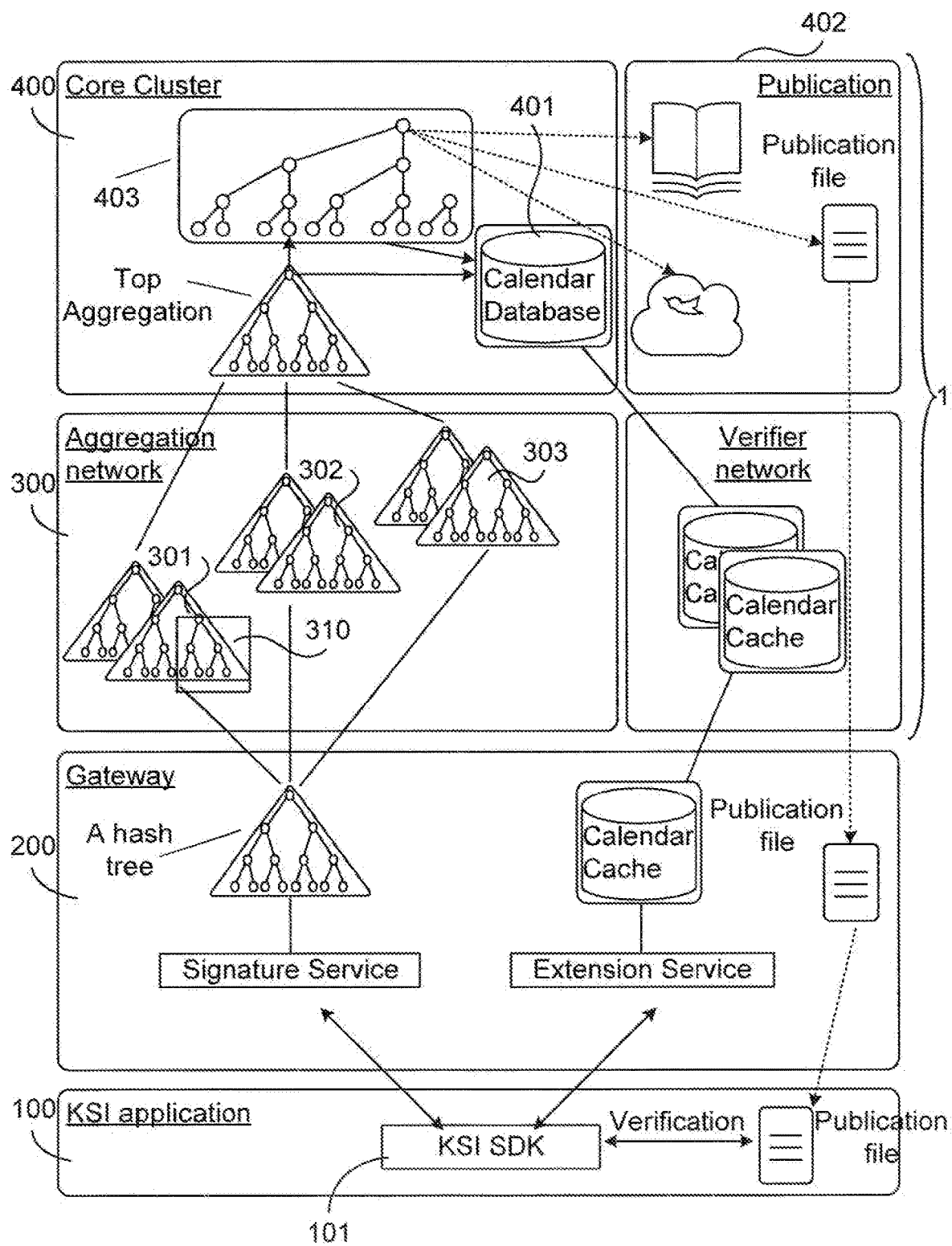
FIG. 1 illustrates a keyless signature infrastructure system.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

For sake of completeness and for providing a thorough understanding of the present teachings and the various embodiments disclosed herein, description on some basics of Keyless Signature Infrastructure (KSI) technology is provided initially. It is noted that KSI is used as an exemplary technology for implementing aspects disclosed herein. It is however noted that other hash-tree based technologies may be used.

A hash-tree based signing technology is a digital signature scheme using hash trees, also denoted Merkle trees. The hash tree is a binary tree where each node represents a hash value (often denoted simply "hash") of its child nodes. A hash value in turn is the result when applying a hash function to an input, and a perfect hash function would give, for each input, a different hash value (i.e. be injective). The structuring principles of hash chains are described with reference to FIG. 2. It is noted that hash trees and hash functions are well known to persons skilled in the art of cryptology or document signing and verification, and the Merkle tree structure as such has been known for long time.

FIG. 1 illustrates components of a KSI architecture and is also an environment in which aspects of the present teachings may be implemented. A KSI network 1 comprises four main layers.

A first layer is a KSI user application layer 100 for KSI adapted applications. The KSI adapted application 100 (in the following also denoted KSI application) is the source of data to be signed by using the KSI network 1, and may be provided in a client device. The KSI application 100 integrates a Keyless Signature Infrastructure Software Development Kit (KSI SDK) 101 Application Programming Interface (API) in order to communicate with a signing service and extension/verification service of a KSI gateway layer 200. In KSI, the data to be signed is hashed by the KSI application 100 and the hash value is sent to the KSI network 1 for getting a signature for it. In the context of signature request, it is noted that the data itself is not sent out from the KSI application 100, only the hash value of it.

The KSI application 100 may use any type of cryptolibrary for generating data hashes or it may utilize a hash function support of the KSI SDK 101. As mentioned in the background section, in order to be able to provide the integrity verification of a data, the KSI application must, according to prior art, store the signature token and link it to the respective data item somehow, e.g. with metadata or by storing the signature token with the data item. According to the present teachings, this requirement is alleviated by instead storing part of the signature in, for instance, the KSI network 1 and part of the signature in the KSI application 100. The storage requirement on a KSI device (comprising the KSI application 100) that owns the data and uses a KSI network 1 for protecting it is lessened since only part of the signature is stored therein instead of the entire signature.

A second layer is the gateway layer 200. The KSI gateway (GW) provides an interface between the KSI application 100 and the KSI network 1 and handles data signing and verification/extension requests from the KSI application 100. The KSI GW implements a global aggregation hash-tree aggregating data hashes sent from the KSI application 100. From the KSI GW the signing request proceeds to an aggregation network layer 300 using e.g. a User Datagram Protocol (UDP) or Transport Control Protocol (TCP) based protocol. Signing requests are sent to all parent aggregators 301, 302, 303 in a cluster serving the particular KSI GW.

A third layer is hence the aggregation network layer 300. In KSI, a component hash tree denoted aggregator is used and each aggregator acts asynchronously. In FIG. 1, one such aggregator is indicated at reference numeral 310. The aggregator 310 takes hash values as input, generates a root hash value and sends the root hash value to one or more parent aggregators.

A root hash from the first level of global aggregation, also denoted gateway level aggregation, is sent to the aggregation network 300. The aggregation network 300 comprises distributed aggregation servers called aggregators, which comprise a global distributed aggregation network. For resiliency reasons the aggregators may be deployed as server clusters. Each cluster member receives the same input request from the child aggregators and they run independently in an unsynchronized manner. The aggregation network layer 300 is a second level of aggregation.

A fourth layer is a core cluster layer. The core cluster 400 comprises servers that typically are geographically distributed, e.g. located in different data centers. The core cluster 400 implements a top level aggregation hash-tree, a calendar hash-tree, a calendar database 401 and publication functions 402. Top root hash values that are generated by the aggregation network 300 are stored in the calendar database 401 e.g. once per second. Top hash values for each second (or other time scale) are linked together in a unique hash tree known as a calendar hash-tree 403. Time value is encoded as the shape of the calendar and the top hash of the calendar is periodically published. The publication function 402 is hence a set of values comprising publication code and publication check-times periodically published in printed and electronic media (e.g. Internet) and stored in a publication file. The publication code is a string of characters used to verify a signature.

Figure 2:
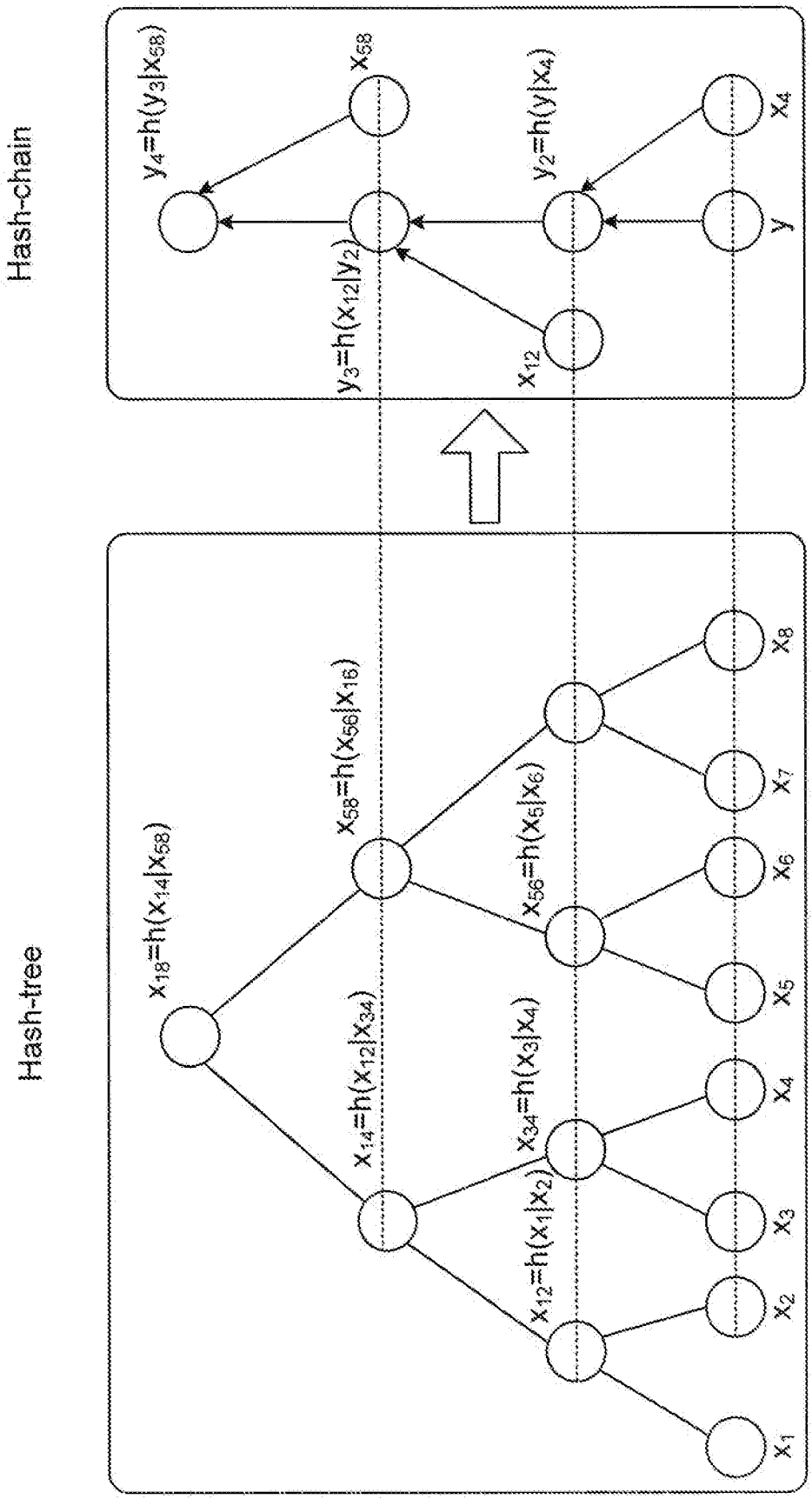
FIG. 2 illustrates a hash-chain assembly.

FIG. 2 illustrates a hash-chain in a verification process. A brief description of structuring principles of hash chains is provided next. A KSI device (not shown) sends a hash of a data asset, e.g. a document, to the KSI network (not shown) and receives a data signature token, which is proof that the data existed in a certain form at the given time and that the request was received through a specific access point. All received requests are aggregated together into a large hash tree. The signature token contains data for reconstructing a path through the hash tree starting from a signed hash value (a leaf, e.g. $X_3$ of FIG. 2) to the top hash value ($X_{18}$ of FIG. 2). For example, letting $X_3$ indicate the original data hash and y a new hash value of the same data of which integrity is to be verified. Then nodes $X_4$, $X_{12}$ and $X_{58}$ are needed with concatenation order information for generating $y_4$, as illustrated by the hash-chain on right hand-side of FIG. 2. That is, y is first concatenated with $X_4$ and a hash value $y_2=h(y|X_4)$ is calculated, which is used as input to the next hash step with $X_{12}$, giving $y_3$ and so on. If $y_4=X_{18}$, then y must be equal with $X_3$ and thus $X_3$ must have been a part of the original hash-tree proofing that the data over which the hash $X_3$ was generated has not been changed. Hence, if $y_4=X_{18}$, then it is safe to assume that $y_4$ was in the original hash tree (left-hand side of FIG. 2).

With reference again to FIG. 1, the aggregation network structure is illustrated on a high level. The lowest level aggregation hash-tree of the aggregation network 300 receives root hashes from a number of gateways, set those as leafs of its hash-tree and aggregates these to the new root hash value in line with principles described above with reference to FIG. 2. The new root hash is then sent to the next upper level aggregation hash-tree (parent aggregator) generating the next root hash (3rd level aggregation) respectively. The top root hash generated by this aggregation level is then sent to the core cluster 400 where the final top level aggregation is performed.

For redundancy reasons a root hash from a child aggregator is sent to several parent aggregators in an aggregator cluster. The first response from an upper level aggregator is accepted and subsequent responses are discarded by a child aggregator.

Figure 3:
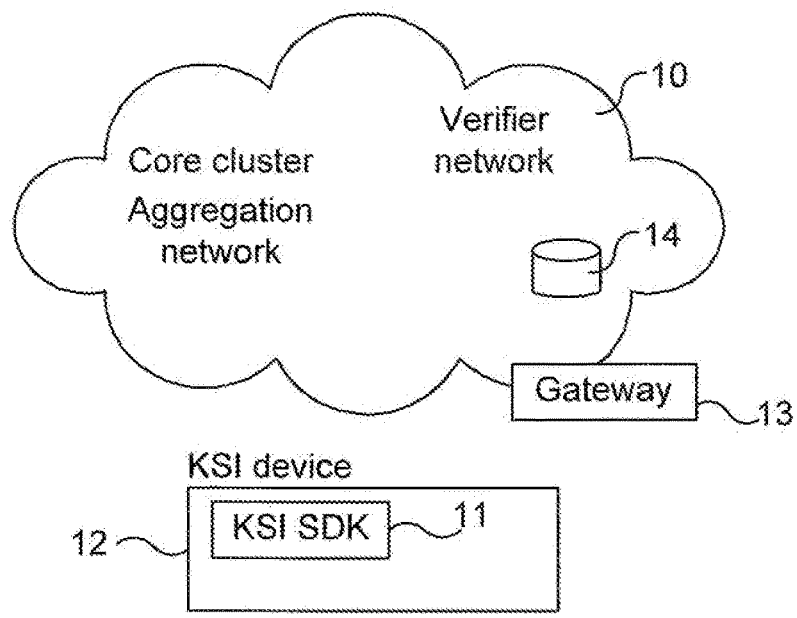
FIG. 3 illustrates an environment in which embodiments according to the present teachings may be implemented.

FIG. 3 illustrates an environment in which embodiments according to the present teachings may be implemented. A hash-tree based network 10, again exemplified by a KSI network 10, comprises a core cluster aggregation network and verifier network as has been described and exemplified by a KSI network. A first device 13, in the following exemplified by a gateway device 13, receives and handles KSI signing requests and verification requests and may be part of the KSI network 10. In other embodiments, the gateway device 13 may be part of a system comprising the KSI device 12. For instance, the KSI device 12 may be part of a sensor network, wherein the sensors communicate through the gateway device 13, which is also part of the system. The gateway device 13, in the following exemplified by a KSI gateway 13, is arranged for communication with client devices 12, which are exemplified by KSI devices 12. The KSI network 10 may comprise one or more data storages 14.

The KSI network 10 may also comprise a number of servers, virtual machines and other processing devices, gateways etc. for providing a hash-based data signing technology, e.g. as described e.g. with reference to FIGS. 1 and 2. The KSI network 10 may hence comprise a core cluster, an aggregation network, a verifier network etc. Details of the KSI network 10, such as number of layers of aggregations servers, is not important for the present teachings, and may be according to a KSI network such as described with reference to FIGS. 1 and 2. The KSI network 10 may comprise still further conventional components, not illustrated, such as e.g. publication functions.

The KSI device 12 is typically not part of the KSI network 10. The KSI device 12 is a KSI device seeking the services provided by the KSI network 10, in particular the service of protecting its data. The KSI device 12, which may be a KSI adapted client or KSI application, integrates a KSI Software Development Kit (SDK) 11 (Application Programming Interface, API). The KSI SDK 11 provides an interface that is needed towards a KSI service provided by the KSI network 10. A data signing request is sent from the KSI device 12 via the KSI SDK 11 thereof. The KSI SDK 11 may also provide data validation logic and the needed verification interface towards the KSI network 10. The KSI SDK 11 is responsible for combining the data and the KSI signature, and for storing the KSI signature, or in accordance with embodiments of the present teachings, for storing part of the KSI signature.

The KSI device 12 may, for instance, be any type of Internet of Things (IoT) device, i.e. any type of device with connectivity to Internet, typically wireless connectivity. The KSI device 12 may for instance comprise a so-called smart device, which may refer to any device or application connected to the Internet and/or to a mobile network. As another example, the KSI device 12 may be a device of a smart grid, i.e. an electrical grid using communications technology to gather (and/or act on) information. Still other examples on KSI devices 12 comprise heart monitoring implants, sensor devices of sensor networks etc.

It is noted that the KSI device 12 does not necessarily need to have Internet connectivity, it needs to be able to communicate with the KSI network 10, e.g. via the KSI gateway 13. The KSI device 12 may for instance communicate with the KSI gateway 13 over a wireless communications network using, for instance, a radio interface such as a GSM, WCDMA, Long Term Evolution (LTE), 3G, 4G, 5G or access technologies such as those of the IEEE 802.11 (Wireless Local Area Network, WLAN) or 802.16 (WiMAX) families or still other wireless communication systems. The KSI device 12 may communicate with the KSI gateway 13 indirectly, via one or more intermediated devices (not illustrated in FIG. 3). For instance, if the KSI device 12 is a sensor device of a sensor network, it may communicate with a gateway of the sensor network, e.g. over WLAN. The gateway of the sensor network then communicates (directly or indirectly via still other devices) with the KSI network 10 (in particular the KSI gateway 13 thereof), and may provide a first level aggregation.

Figure 4:
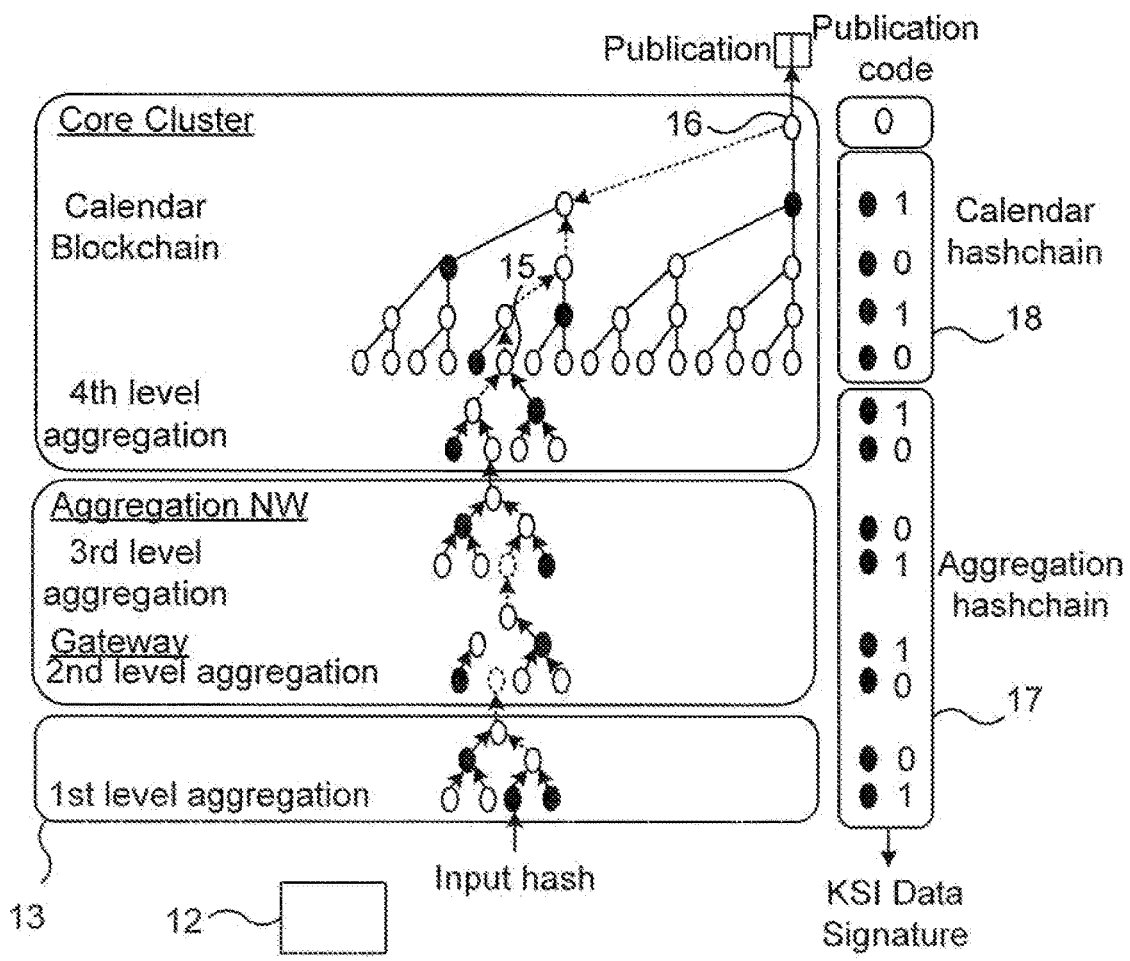
FIG. 4 illustrates obtaining of a publication code based on input data.

FIG. 4 illustrates a signature request process and the obtaining of a publication code based on input data. When the KSI device 12 has data to be signed, the data is hashed by the KSI device 12 and the hash value is sent to the KSI network 10 for getting a signature for it. In the context of signature request, it is noted that the data itself is not sent from the KSI device 12, only the hash value of it. The unique path through the hash trees of the KSI network 10 by the dashed arrows and the filled-in nodes of the hash-trees are "fingerprints" enabling a later verification of data as described with reference to FIG. 2. These filled-in nodes constitute an aggregation hash chain 17, as illustrated at the right-hand side of FIG. 4. This aggregation hash chain ends in a core cluster layer of the KSI network 10, and in particular in a root hash 15 of a global aggregation tree. The remaining nodes of the unique path constitute a calendar hash chain 18, as also illustrated at the right-hand side of FIG. 4. Finally, a root hash 16 of a calendar block chain is illustrated. The root hash 16 is then the publication code, also illustrated at the right-hand side of FIG. 4. FIG. 4 may be seen as a snap-shot on how to get a publication code for particular input data. The KSI signature comprises the aggregation hash chain (AHC) 17 and the calendar hash chain (CHC) 18.

Figure 5:
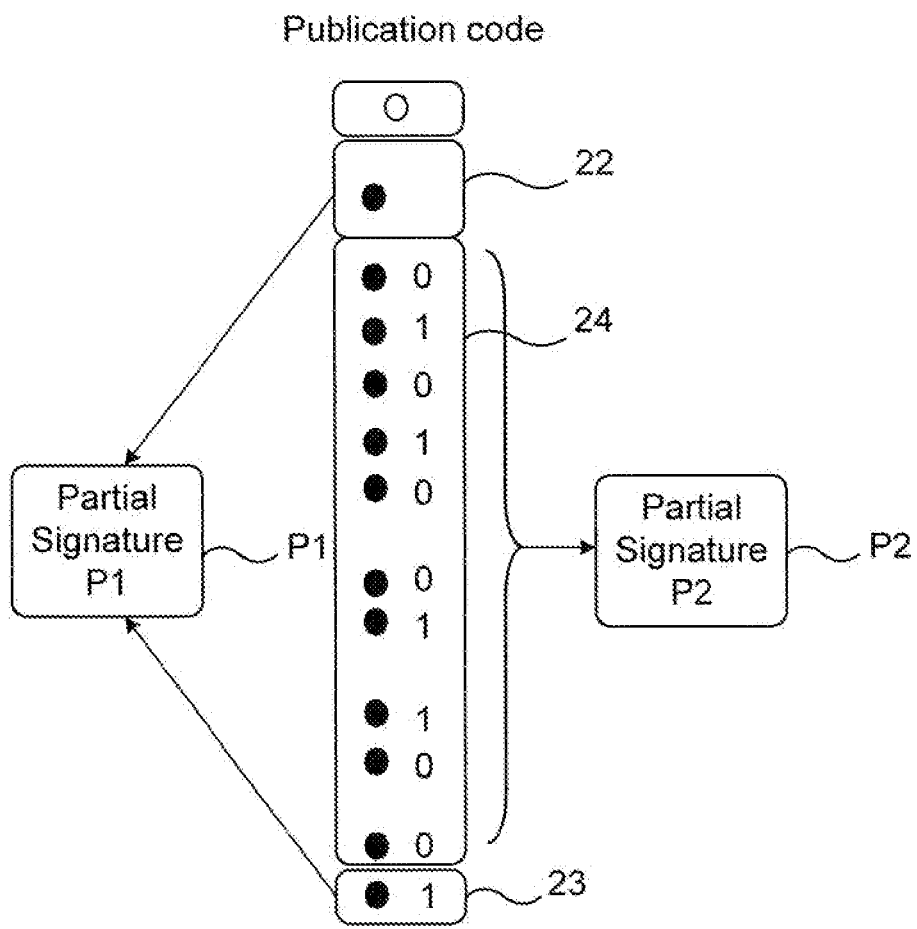
FIG. 5 exemplifies a partial signature division according to the present teachings.

FIG. 5 exemplifies an aspect of the present teachings. A solution is provided, in various embodiments, wherein the KSI signatures are split into two partial signatures. As an example, the first such partial signature P1 may contain the last slice of aggregation hash chain 23 and the root of the calendar tree 22. A second such partial signature P2, i.e. the remaining part of the assembled signature, may contain the hash chains 24 that connect the tail hash of P1 to the head hash of P1 (compare reference numeral 24 here to reference numeral 17 of FIG. 4). However, various other ways of splitting the signature into partial signatures are conceivable, and this particular way is given purely as an example.

Next, the hash chain illustrated in FIG. 2 is used for giving an example on how the first partial signature P1 and the second partial signature P2 may be determined:

the first partial signature P1 comprises, for instance (depending on how the splitting is made), $x_4$ and $y_4$, i.e. P1=$[x_4, y_4]$, wherein $y_4$=$h(y_3|x_{58})$, as shown in FIG. 2, and the second partial signature P2 comprises $x_{12}$ and $x_{58}$, i.e. P2=$[x_{12}, x_{58}]$ In order to reconstruct a valid signature the first partial signature P1 and the second partial signature P2 needs to be combined. In the exemplifying case, this reconstruction is performed according to:

$$h(h((h(y)|x_4)|x_{12})|x_{58})=y_4$$

, wherein h( ) is a hash function, | is concatenation, and h(y) is the hash of the data to be protected or verified.

If strong hash functions are used, i.e. collision resistant, pre-image resistant hash functions, then it is computationally infeasible for a party that has access only to the second partial signature P2 to determine the mathematically related first partial signature P1. The integrity of the verification process is increased if the KSI device 12 performs the verification procedure locally with an assembled, complete signature as opposed to the verification process being performed externally to the KSI device 12. The complete signature or partial signatures may be further protected through signing the partial signatures or signing the complete reassembled signatures with asymmetric encryption cryptographic algorithms (i.e. public key encryption) to provide non-reputation, authentication an additional level of integrity validation.

The first partial signature P1 may be stored on the KSI device 12 (e.g. a smart device). In view of the KSI device 12 often having limited storage capacity, the first partial signature P1 is preferably small.

The second partial signature P2 may be stored on a remote gateway, e.g. a KSI gateway 13 or a storage device (e.g. network storage device) or a gateway device of the KSI device 12 owner, through which the KSI device 12 communicates its data to a remote application server. The second partial signature P2 may correspondingly be larger than the first partial signature P1. The first and second partial signatures P1, P2 together constitute a KSI signature received from the KSI network 10. The first and second partial signatures P1, P2 are mathematically related, and in particular mutually mathematically interdependent.

The ratio between the sizes of the partial signatures P1, P2 may be selectable. Their respective sizes may be selected e.g. in view of available bandwidth and storage capacity. For instance, if the KSI device 12 is highly limited in view of storage capacity, the first partial signature P1 can be selected to be very small, while the second partial signature P2 may be correspondingly larger. A number of advantages are obtained owing to this adjustability; the partial signatures may, for instance, be adapted for the particular application at hand.

The partial signatures P1, P2 may be temporarily combined on the KSI device 12 before performing a verification request, as will be described later (e.g. in relation to FIGS. 7 and 8). Such combined, complete signature may optionally be retained if an offline verification against the public file is desired.

The herein proposed idea does not rely on any trust dependency for secure KSI signature storage on the KSI device 12 or the KSI gateway 13 or the communication channel between them. This is owing to the required combining of mathematically related signatures which are distributed.

The signature size may be significantly reduced, e.g. reduced by over 80% of the original signature size for the KSI device 12, and local disk storage requirements may hence be relaxed. It is noted that this is given purely as an example, and that the signature size reduction is dependent on the particular implementation. Further, the signature size reduction can be made without compromising the integrity of the verification process.

The data owner maintains independent verification of their data while still saving on storage capacity in the KSI device 12. For example, the KSI device 12 may be owned by a data owner (e.g. an enterprise) who stores the partial signature on an "external parties" remote storage gateway. The signature is only valid and usable when reassembled by the data owner. The data owner does not have to disclose complete signature to the external party. The data owner does not have to trust the integrity of the service provider(s) which transmit and store partial keys. The data owner may have the second partial signature disclosed to a third party if the third party is maintaining the gateway and/or signing function. In some embodiments therefore, the second partial signature may be sent to the third party from a gateway belonging to the data owner. There are various possibilities for the storage of the second partial signature P2: it may reside on a storage device on a gateway managed by the data owner, on a storage device external to the gateway that is managed by the data owner or on a storage device external to the gateway that is managed by an external party (KSI service provider).

The solution, in its various embodiments, is resistant to so called man-in-the-middle (MITM) attacks against the signature (hash value) transmission or reference key between the KSI device 12 and the KSI gateway 13 storing a signature external to the KSI device without requiring shared secrets (e.g. symmetric key encryption or keyed hash message authentication codes).

Figure 6:
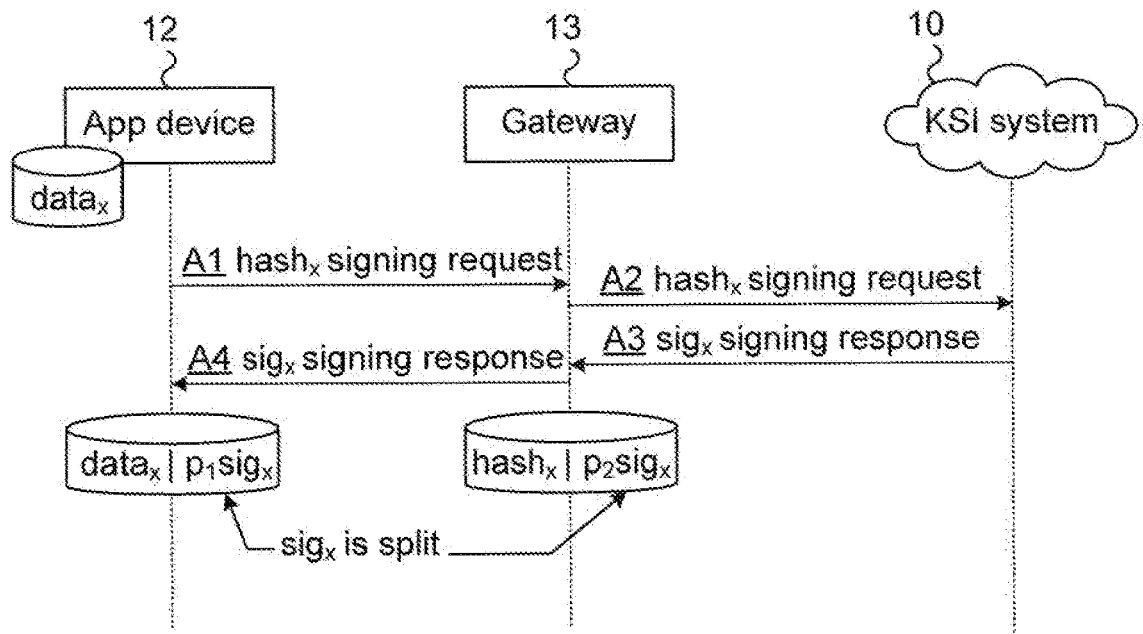
FIG. 6 is a signaling diagram for a signing request according to the present teachings.

FIG. 6 illustrates a signaling flow between components according to embodiments of the present teachings, and in particular signaling during a signing request. During a signing request a partial signature request (abbreviated PSR herein) may be initiated by setting a new indicator flag 'PSR' in the signing request message from the KSI device 12. The KSI SDK 11 of the KSI device 12 may be configured to perform such signing request. At arrow A1, the PSR flag is set and the signing request message is sent from the KSI device 12 to the KSI gateway 13. Arrows A2, A3 and A4 may, in some embodiments, be entirely according to conventional handling of a signing request.

This setting of flag by the KSI device 12 can be made in order for the KSI gateway 13 to know that partial signatures are to be used. In other aspects, the signaling indicated by arrows A1, A2, A3 and A4 can be according to known KSI procedures. In other embodiments, the KSI gateway 13 may be preconfigured to know that partial signatures should always be used for a certain KSI device 12. That is, no explicit indication, such as the PSR flag, is then needed, and this signing request may be according to known KSI procedures, e.g. simply based on the identity of the requesting KSI device 12.

In an embodiment, the KSI gateway 13 always stores a partial signature (second partial signature P2) and the KSI device 12 may be configured to keep the complete signature (first and second partial signatures P1P2) by default. The KSI device 12 may, at a later time, decide to discard the second partial signature P2, for instance if and when it becomes low on storage, or for signatures that are seldom used for verification. Such embodiments entail several advantages. For instance, by keeping the complete signature for frequently used signatures a lower bandwidth consumption on the verification procedure is obtained for these signatures.

Whether or not the KSI device 12 should keep the second partial signature P2 can be decided in different ways. Two mechanisms in the KSI device 12 are given in the following for deciding on which signatures should keep also the second partial signature P2 (that is, which signatures should not have the second partial signature P2 deleted).

In a first exemplary embodiment (a first mechanism), the KSI device 12 keeps a queue of least frequently used signatures and strips out the second partial signature P2 from these signatures. The most frequently used signatures have their complete signature (P1P2) persistently stored.

In a second exemplary embodiment (a second mechanism), the KSI device 12 marks signatures to be used for offline verification in the future. In this case the full signature is maintained on the client (i.e. the second partial signature P2 is not deleted). If only the first partial signature P1 exists on the client, then a request for the second partial signature P2 is issued in order to reconstruct the full signature on the KSI device 12 for later 'offline verification'.

The above first and second embodiments may also be combined. For instance, a signature seldom used would according to the first embodiment keep only the first partial signature, but if this signature is to be used for offline verification a request for the second partial signature P2 could nevertheless be made and the full signature be stored in the KSI device 12.

In some embodiments, the KSI gateway 13 only returns the first partial signature P1 to the KSI device 12. The KSI device 12 hence has to treat this as a response to a partial signature request even if it expected the complete signature. Such embodiments have the advantage of reduced bandwidth use (and reduced bandwidth requirement). The KSI gateway 13 may decide to return only the first partial signature P1 based, for example, on temporary congestion in the network.

After the signing response has been received by the KSI device 12 (arrow A4) and the KSI gateway 13 (arrow A3), a partial signature request (PSR) procedure according to aspects of the present teachings is invoked. This PSR procedure comprises splitting of the signature $sig_x$ received from the KSI network 10 in accordance with an agreed upon way. The KSI device 12 and the KSI gateway 13 both know how the signature $sig_x$ received from the KSI network 10 should be split. In the KSI device 12, the aggregation chain in the KSI signature may, for instance, be stripped out, leaving only the original hash value and Merkle root along with authentication records and other required headers. This is an example on the first partial signature, P1. P1 may be stored on the KSI device 12 that performed the signing request, together with the protected data, i.e. stored as $(data_x|p_1sig_x)$. The remaining part of the received signature is, in various embodiments, discarded, i.e. not stored and the KSI device 12 then has only knowledge of the first partial signature 20. Various advantages are obtained by storing only part of the signature in the KSI device 12. For instance, the storage capacity can be kept small and the integrity of the KSI device 12 is improved in that it is rendered secure against tampering.

The aggregation chain which was removed may be stored into the second partial signature P2 on the KSI gateway 13 or other storage device together with the reference hash, i.e. stored as $(hash_x|p_2sig_x)$, wherein hash, thus is the hash of the data data, to be protected. As described for the KSI device 12, also the KSI gateway 13 may be discarded, i.e. not stored therein, again rendering the KSI procedure secure against tampering.

It is again noted that the signature from the KSI network 10 may be split in other ways as well, besides the herein described exemplary way. As described earlier, the splitting of the signature can be made tunable and the respective sized can be selected depending e.g. on available storage capacity or available bandwidth on the communication media used (typically wireless communication). The sizes of the partial signatures P1, P2 that are used by the KSI device 12 may also be changed continuously, or upon detecting that some criterion is fulfilled (e.g. the size can be made smaller if free storage capacity is below a threshold) or upon need.

Figure 7:
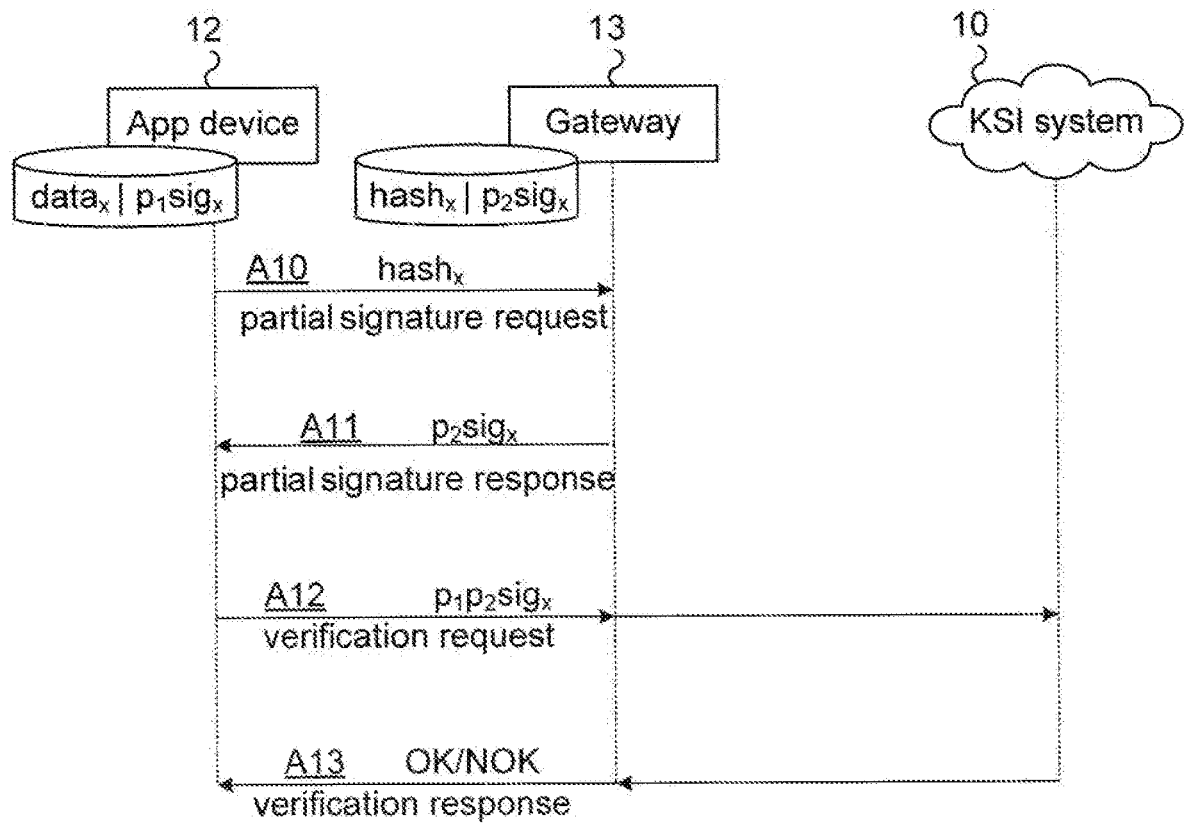
FIG. 7 is a signaling diagram for a verification request according to the present teachings.

FIG. 7 illustrates signaling flow between components according to embodiments of the present teachings, and in particular signaling during a verification process. During a signature verification request a partial signature request may be initiated by setting a new indicator, e.g. an indicator flag 'PSV' in the verification request message from the KSI device 12 (in particular the KSI SDK 11 thereof).

At arrow A10, the KSI device 12 sends a 'Partial signature 2, (P2)' request to the to the KSI gateway 13.

At arrow A11, and in response to the 'Partial signature 2, (P2)' request, the second partial signature P2 (reference numeral 21 of FIG. 5) is returned by the KSI gateway 11 to the KSI device 12. The original signature can now be reconstructed according to an agreed upon way. This reconstruction can, for instance and continuing the example used in relation to FIG. 6, be made by inserting the aggregation chain from the second partial signature P2 into the first partial signature P1 (reference numeral 20 of FIG. 5).

The conventional verification request procedure as described in the KSI standard may then invoked using the regenerated signature.

In accordance with the present teachings KSI signatures, or other hash-tree based signatures, are split into two components that are mathematically related through the computation of the hash chain through the aggregation tree. The partial signatures are distributed on two independent systems: the signing/verifying system (e.g. KSI network) and the signature storage system (e.g. a KSI device). The partial signatures are recombined to a complete signature on verification. The complete signature may be disregarded after verification in order to reduce storage requirements. In some embodiments, the complete signature may be retained on the KSI device in order for the device to execute a standard offline verification at a later time. The integrity of the complete signature is increased owing to its components P1, P2 being initially distributed.

The various embodiments and features that have been described may be combined in many ways, examples of which are given in the following, with reference first to FIG. 8.

Figure 8:
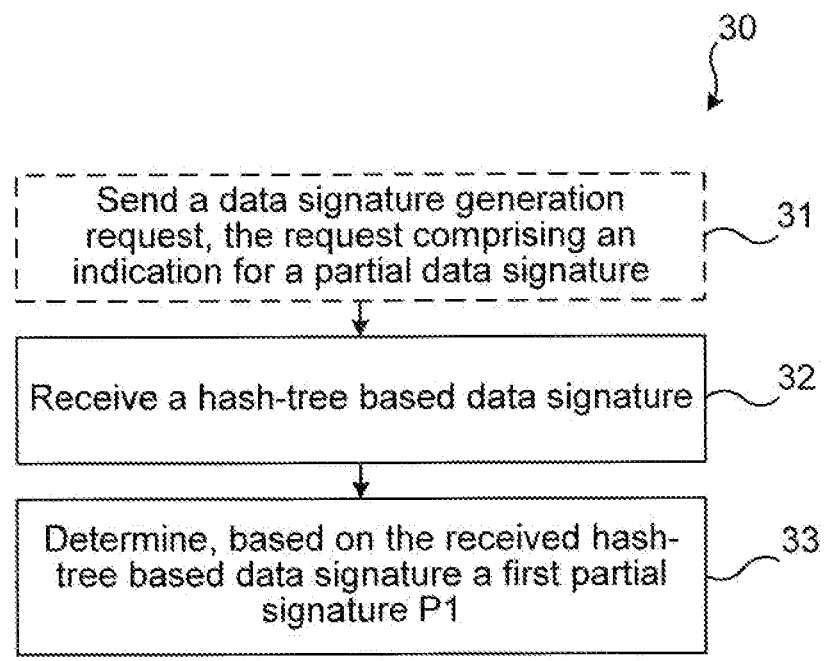
FIG. 8 illustrates a flow chart over steps of an embodiment of a method in a client device in accordance with the present teachings.

FIG. 8 illustrates a flow chart over steps of an embodiment of a method in a client device in accordance with the present teachings. The method 30 of handling a hash-tree based data signature is provided. The method 30 may be performed in a client device 12, e.g. as described with reference to FIG. 3 and/or FIG. 9.

The method 30 comprises receiving 32, from a gateway device 13, a hash-tree based data signature. As has been noted before (e.g. in relation to FIG. 3), the hash-tree based data signature may be obtained directly from the gateway device 13, or via intermediate nodes and devices. That is, the client device 12 may communicate with the gateway device 13 directly or indirectly, via one or more intermediated devices.

The method 30 comprises determining 33, based on the received hash-tree based data signature, a first partial signature, P1.

The method 30 provides various advantages. For instance, the signature size is significantly reduced in the client device 12, and the storage capacity of thereof is saved. Further, increased security is obtained e.g. since the partial signature cannot be used alone for verification, and the signature is valid and usable only when reassembled with a second partial signature, which may be stored on a storage device of an external party.

In an embodiment, the method 30 comprises, prior to the receiving 32, sending 31 to the gateway device 13 a data signature generation request, the request comprising an indication for a partial data signature. This is an optional step and is illustrated in FIG. 8 in a box drawn with dashed lines.

In some embodiments, the determining 33 comprises splitting the hash-tree based data signature into a first partial signature, P1, and a second partial signature, P2. For instance, and according to an embodiment, the splitting the hash-tree based data signature may be effectuated by an indication specifying how to split the hash-tree based data signature. Such indication may be provided to the client device 12, or it may be preconfigured with such information or set of instructions on how to perform the splitting.

In various embodiments, the method 30 comprises storing the first partial signature, P1, and deleting remaining parts of the received hash-tree based data signature. This is advantageous e.g. in that the integrity is improved, making it harder to tamper with the client device in order to obtain the protected data. Further, required memory capacity of the client device 12 may also be reduced, which is a cost saving.

In various embodiments, the method 30 comprises:
storing the hash-tree based data signature, and
upon determining that one or both of a storage criterion and a usage criterion is fulfilled, storing the first partial signature, P1, and deleting remaining parts of the hash-tree based data signature. The storage criterion may, as described earlier, comprise the remaining storage capacity of the client device 12 reaching an upper limit. The usage criterion may, as described earlier, comprise offline verification need being established or frequency of use falling below a threshold value.

In various embodiments, the method 30 comprises using the first partial signature in a verification procedure towards a keyless signature infrastructure, KSI, system 10 for verifying integrity of a data asset.

In a variation of the above embodiment, the using comprises:
requesting the second partial signature, P2, from the gateway device 13,
assembling a data signature based on the first partial signature, P1, and the received second partial signature, P2, and
sending the assembled data signature in a verification request to the gateway device 13 for conveyance to the KSI system 10.

The data signature may hence be reassembled by the client device 12 when it has received the second partial signature P2 from the gateway device. The client device 12 may comprise a set of instructions on how to reassemble the signature. As indicated earlier, by requiring reassembly o f the signature upon need, i.e. not having the entire data signature stored locally in the client device 12 security is increased, while keeping memory requirements down.

Figure 9:
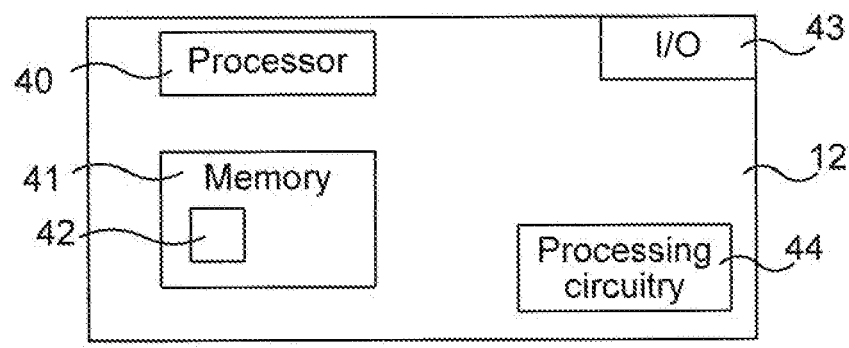
FIG. 9 illustrates schematically a client device and means for implementing embodiments in accordance with the present teachings.

FIG. 9 illustrates schematically a client device and means for implementing embodiments in accordance with the present teachings.

The client device 12 comprises a processor 40 comprising any combination of one or more of a central processing unit (CPU), multiprocessor, microcontroller, digital signal processor (DSP), application specific integrated circuit etc. capable of executing software instructions stored in a memory 41 which can thus be a computer program product. The processor 40 can be configured to execute any of the various embodiments of the method 30 for instance as described in relation to FIG. 8.

The memory 41 of the client device 12 can be any combination of read and write memory (RAM) and read only memory (ROM), Flash memory, magnetic tape, Compact Disc (CD)-ROM, digital versatile disc (DVD), Blu-ray disc etc. The memory 41 may also comprise persistent storage, which, for example, can be any single one or combination of magnetic memory, optical memory, solid state memory or even remotely mounted memory.

The client device 12 comprises an interface 43 for communication with other devices. The interface 43 may, for instance, comprise a protocol stack, for communication with other devices. The client device 12 may, for instance, comprise a KSI SDK 11 providing an interface that is needed towards a KSI service provided by a KSI network 10. The interface may be used for sending a data signing request is sent from the client device 12 via the interface 43.

The client device 12 may be a smart device, a machine-to-machine device, a KSI adapted device, a general computing device etc. It is noted that the client device 12 has been described earlier, e.g. with reference to FIG. 3 and reference is made to this description for further examples and details.

The client device 12 may comprise additional processing circuitry, schematically indicated at reference numerals 44 for implementing the various embodiments according to the present teachings.

A client device 12 is provided for handling a hash-tree based data signature. The client device 12 is configured to:
receive, from a gateway device 13, a hash-tree based data signature, and
determine, based on the received hash-tree based data signature, a first partial signature, P1.

The client device 12 may be configured to perform the above steps e.g. by comprising one or more processors 30 and memory 41, the memory 41 containing instructions executable by the processor 40, whereby the client device 12 is operative to perform the steps. That is, in an embodiment, a client device 12 is provided for handling a hash-tree based data signature. The client device 12 comprises one or more processors 40 and memory 41, the memory 41 containing instructions executable by the processor 40, whereby the client device 12 is operative to receive, from a gateway device 13, a hash-tree based data signature, and determine, based on the received hash-tree based data signature, a first partial signature, P1.

In an embodiment, the client device 12 is configured to, prior to receiving, send to the gateway device 13 a data signature generation request, the request comprising an indication for a partial data signature.

In an embodiment, the client device 12 is configured to determine by splitting the hash-tree based data signature into a first partial signature, P1, and a second partial signature, P2.

In an embodiment, the client device 12 is configured to split the hash-tree based data signature using an indication specifying how to split the hash-tree based data signature.

In an embodiment, the client device 12 is configured to store the first partial signature, P1, and to delete remaining parts of the received hash-tree based data signature.

In an embodiment, the client device 12 is configured to:
store the hash-tree based data signature,
determine that one or both of a storage criterion and a usage criterion is fulfilled, and in response thereto store the first partial signature, P1, and delete remaining parts of the hash-tree based data signature. In an embodiment, the client device 12 is configured to use the first partial signature in a verification procedure towards a keyless signature infrastructure, KSI, system 10 for verifying integrity of a data asset.

In a variation of the above embodiment, the client device 12 is configured to use the first partial signature by:
requesting the second partial signature, P2, from the gateway device 13,
assembling a data signature based on the first partial signature, P1, and the received second partial signature, P2, and
sending the assembled data signature in a verification request to the gateway device 13 for conveyance to the KSI system 10.

The present teachings also encompass a computer program 42 for a client device 12 for handling a hash-tree based signature. The computer program 42 comprises computer program code, which, when executed on at least one processor on the client device 12, causes the client device 12 to perform the method 30 according to any of the described embodiments.

The present teachings also encompass computer program products 41 for a client device 12. The computer program product 41 comprises a computer program 42 for implementing the embodiments of the methods as described, and a computer readable means on which the computer program 42 is stored. The computer program product, or the memory, thus comprises instructions executable by the processor 40. Such instructions may be comprised in a computer program, or in one or more software modules or function modules. The computer program product 41 may, as mentioned earlier, be any combination of random access memory (RAM) or read only memory (ROM), Flash memory, magnetic tape, Compact Disc (CD)-ROM, digital versatile disc (DVD), Blu-ray disc etc.

Figure 10:
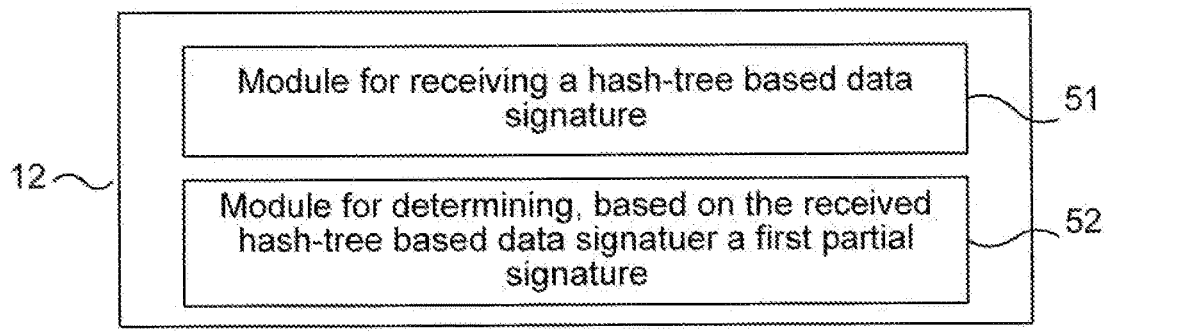
FIG. 10 illustrates a client device comprising function modules/software modules for implementing embodiments of the present teachings.

FIG. 10 illustrates a client device comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 30 that has been described.

A client device is provided for handling a hash-tree based data signature. The client device comprises a first module 51 for receiving, from a gateway device, a hash-tree based data signature. Such first module 51 may, for instance, comprise processing circuitry and/or receiving circuitry, and/or an interface for such reception.

The client device comprises a second module 52 for determining, based on the received hash-tree based data signature, a first partial signature. Such second module 52 may, for instance, comprise processing circuitry adapted to determine a partial hash-tree based data signature.

It is noted that one or both of the modules 51, 52 may be replaced by units.

Figure 11:
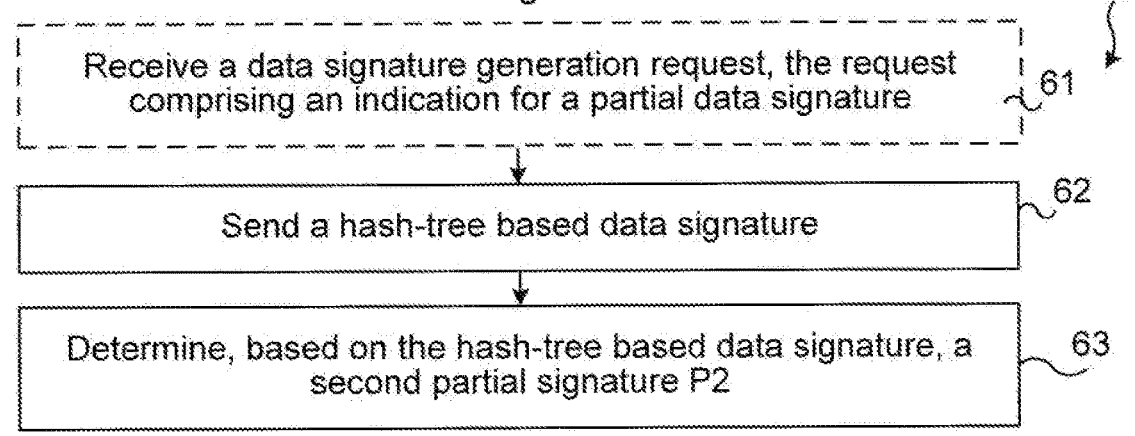
FIG. 11 illustrates a flow chart over steps of an embodiment of a method in a gateway device in accordance with the present teachings.

FIG. 11 illustrates a flow chart over steps of an embodiment of a method in a gateway device in accordance with the present teachings. The method 60 of handling a hash-tree based data signature may be performed in a gateway device 13 e.g. as described with reference to FIG. 3 and/or FIG. 10. The gateway device 13 may, for instance, receive and handle data signing requests and verification requests from e.g. client devices 12 as described above, received either directly from a client device 12 or via intermediate devices such as other gateways. The gateway device 13 may be part of the hash-tree based network 10.

The method 60 comprises sending 62, to a client device 12, a hash-tree based data signature. This hash-tree based data signature may have been created as described e.g. with reference to FIG. 1, and thus received from a hash-tree based network 10, and then sent to the client device 12.

The method 60 comprises determining 63, based on the hash-tree based data signature, a second partial signature, P2.

In an embodiment, the method 60 comprises, prior to the sending 62, receiving 61 from the client device 12 a data signature generation request, the request comprising an indication for a partial data signature. Upon receiving such a request from the client device 12, the gateway device 13 obtains the hash-tree based data signature from the hash-tree based network 10 and, since the indication for a partial data signature is included, the gateway device 13 performs the procedure of determining a second partial signature P2. This is an optional step and is illustrated in FIG. 11 in a box drawn with dashed lines.

In some embodiments, the determining 63 comprises splitting the hash-tree based data signature into a first partial signature, P1, and the second partial signature, P2.

In some embodiments, the method 60 comprises splitting the hash-tree based data signature using an indication specifying how to split the hash-tree based data signature.

In some embodiments, the method 60 comprises storing the second partial signature, P2, and deleting remaining parts of the received hash-tree based data signature. For the case that the hash-tree based data signature was split into a first partial signature, P1, and the second partial signature, P2, the gateway device 13 thus deletes the first partial signature P1.

In some embodiments, the method 60 comprises receiving, from the client device 12, a request for the second partial signature, P2, and sending, to the client device 12, the second partial signature, P2. When a client device 12 e.g. wishes to verify its data the gateway device 13 may receive a request for the second partial signature P2, upon which the gateway device 13 sends it to the requesting client device 12. The client device 12, having the first partial signature P1, may then assemble the entire signature and use it in a verification procedure (e.g. as described with reference to FIGS. 7 and 8).

Figure 12:
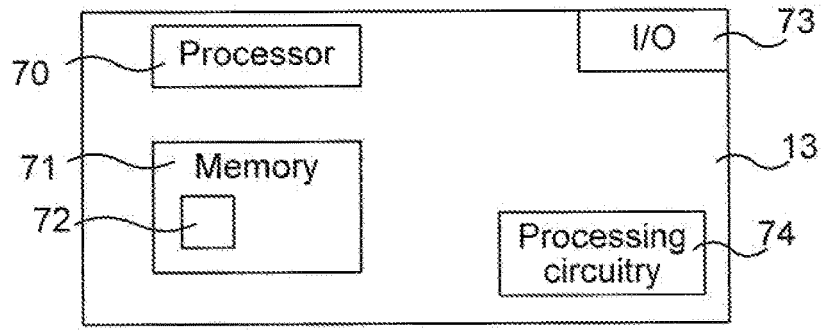
FIG. 12 illustrates schematically a gateway device and means for implementing embodiments in accordance with the present teachings.

FIG. 12 illustrates schematically a gateway device 13 and means for implementing embodiments in accordance with the present teachings.

The gateway device 13 comprises a processor 70 comprising any combination of one or more of a central processing unit (CPU), multiprocessor, microcontroller, digital signal processor (DSP), application specific integrated circuit etc. capable of executing software instructions stored in a memory 71 which can thus be a computer program product. The processor 70 can be configured to execute any of the various embodiments of the method 60 for instance as described in relation to FIG. 11.

The memory 71 of the gateway device 13 can be any combination of read and write memory (RAM) and read only memory (ROM), Flash memory, magnetic tape, Compact Disc (CD)-ROM, digital versatile disc (DVD), Blu-ray disc etc. The memory 71 may also comprise persistent storage, which, for example, can be any single one or combination of magnetic memory, optical memory, solid state memory or even remotely mounted memory.

The gateway device 13 comprises an interface 73 for communication with other devices. The interface 73 may, for instance, comprise a protocol stack, for communication with other devices, such as client devices 12 and gateways. The interface may be used for receiving a data signing requests sent from client devices 12. The interface 73 may be an interface between a data signing application and a hash-tree based network (e.g. and interface between an KSI application 100 and a KSI network 1 as described with reference to FIG. 1).

The gateway device 13 may be part of a hash-tree based network, e.g. a KSI network. It is noted that the gateway device 13 has been described earlier, e.g. with reference to FIG. 3 and reference is made to this description for further examples and details.

The gateway device 13 may comprise additional processing circuitry, schematically indicated at reference numerals 74 for implementing the various embodiments according to the present teachings.

A gateway device 13 is provided for handling a hash-tree based data signature. The gateway device 13 is configured to:

send, to a client device 12, a hash-tree based data signature, and determine, based on the hash-tree based data signature, a second partial signature, P2.

The gateway device 13 may be configured to perform the above steps e.g. by comprising one or more processors 70 and memory 71, the memory 71 containing instructions executable by the processor 70, whereby the gateway device 13 is operative to perform the steps. That is, in an embodiment, a gateway device 13 is provided for handling a hash-tree based data signature. The gateway device 13 comprises one or more processors 70 and memory 71, the memory 71 containing instructions executable by the processor 70, whereby the gateway device 13 is operative to send, to a client device 12, a hash-tree based data signature, and determine, based on the hash-tree based data signature, a second partial signature, P2.

In an embodiment, the gateway device 13 is configured to, prior to sending, receive from the client device 12 a data signature generation request, the request comprising an indication for a partial data signature.

In an embodiment, the gateway device 13 is configured to determine by splitting the hash-tree based data signature into a first partial signature, P1, and a second partial signature, P2.

In a variation of the above embodiment, the gateway device 13 is configured to split the hash-tree based data signature using an indication specifying how to split the hash-tree based data signature.

In an embodiment, the gateway device 13 is configured to store the second partial signature, P2, and to delete remaining parts of the received hash-tree based data signature. The fact that the gateway device 13 only has part of the hash-tree based signature greatly reduces the risk of the signature being tampered with in an unauthorized way.

In an embodiment, the gateway device 13 is configured to receive, from the client device 12, a request for the second partial signature, P2, and to send, to the client device 12, the second partial signature, P2.

The present teachings also encompass a computer program 72 for a gateway device 13 for handling a hash-tree based signature. The computer program 72 comprises computer program code, which, when executed on at least one processor on the gateway device 13, causes the gateway device 13 to perform the method 60 according to any of the described embodiments.

The present teachings also encompass computer program products 71 for a gateway device 13. The computer program product 71 comprises a computer program 72 for implementing the embodiments of the methods as described, and a computer readable means on which the computer program 72 is stored. The computer program product, or the memory, thus comprises instructions executable by the processor 70. Such instructions may be comprised in a computer program, or in one or more software modules or function modules. The computer program product 71 may, as mentioned earlier, be any combination of random access memory (RAM) or read only memory (ROM), Flash memory, magnetic tape, Compact Disc (CD)-ROM, digital versatile disc (DVD), Blu-ray disc etc.

Figure 13:
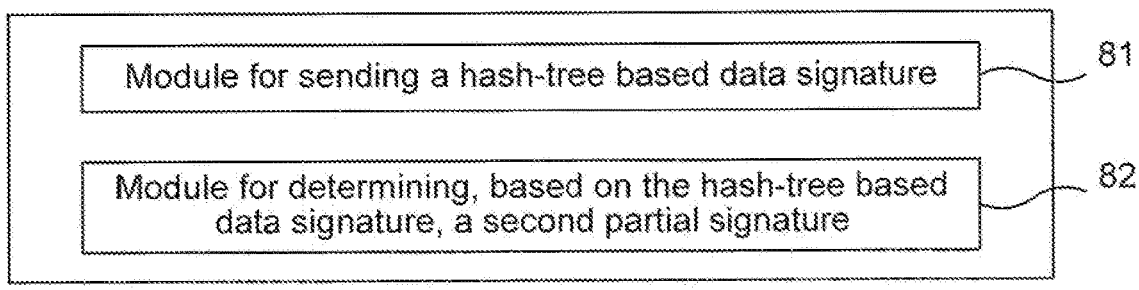
FIG. 13 illustrates a gateway device comprising function modules/software modules for implementing embodiments of the present teachings.

FIG. 13 illustrates a gateway device comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 60 that has been described.

A gateway device is provided for handling a hash-tree based data signature. The gateway device comprises a first module 81 for sending, to a gateway device, a hash-tree based data signature. Such first module 81 may, for instance, comprise processing circuitry and/or transmitting circuitry, and/or an interface for such transmission.

The gateway device comprises a second module 82 for determining, based on the hash-tree based data signature, a second partial signature. Such second module 82 may, for instance, comprise processing circuitry adapted to determine a partial hash-tree based data signature.

It is noted that one or both of the modules 81, 82 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method implemented by a machine-to-machine (M2M) device or Internet-Of-Things (IoT) device of efficiently storing a hash-tree based data signature, the method comprising:
   receiving, from a gateway device in a keyless signature infrastructure (KSI) system, a keyless hash-tree based data signature associated with a data asset;
   splitting the keyless hash-tree based data signature into a first partial signature and a second partial signature, the first partial signature being smaller than the second partial signature, the splitting comprises splitting the keyless hash-tree based data signature using an indication specifying how to split the hash- tree based data signature;
   storing, in memory of the M2M or IOT device, the first partial signature for subsequent use in verifying integrity of the data asset;
   deleting the second partial signature from the memory of the M2M or IOT device; and
   using the first partial signature in a verification procedure towards the KSI system for verifying integrity of a data asset, the using comprising:
      requesting a second partial signature from the gateway device;
      assembling a data signature based on the first partial signature and the received second partial signature; and
      sending the assembled data signature in a verification request to the gateway device for conveyance to the KSI system.

2. The method of claim 1, further comprising, prior to the receiving, sending a data signature generation request to the gateway device, the request comprising an indication for a partial data signature.

3. The method of claim 1 wherein the splitting, storing and deleting is performed in response to determining that one of a storage criterion and a usage criterion is fulfilled.

4. A machine-to-machine (M2M) device or Internet-Of-Things (IoT) device for handling a hash-tree based data signature, the M2M or IOT device comprising:
   processing circuitry;
   memory containing instructions executable by the processing circuitry whereby the M2M or IOT device is configured to:
      receive a keyless hash-tree based data signature associated with a data asset from a gateway device in a keyless signature infrastructure (KSI) system;
      split the keyless hash-tree based data signature into a first partial signature and a second partial signature, the first partial signature being smaller than the second partial signature, the splitting comprises splitting the keyless hash-tree based data signature using an indication specifying how to split the hash-tree based data signature;
      store, in memory of the eliee4 M2M or IoT device, the first partial signature for subsequent use in verifying integrity of the data asset;
      delete the second partial signature from the memory of the M2M or IoT device; and
      use the first partial signature in a verification procedure towards the KSI system for verifying integrity of a data asset, the use comprising:
         requesting a second partial signature from the gateway device;
         assembling a data signature based on the first partial signature and the received second partial signature; and
         sending the assembled data signature in a verification request to the gateway device for conveyance to the KSI system.

5. The M2M or IoT device of claim 4, wherein the instructions are such that the M2M or IoT device is operative to, prior to the receiving, send a data signature generation request to the gateway device, the request comprising an indication for a partial data signature.

6. A method implemented by a gateway device in a keyless signature infrastructure (KSI) system of providing a hash-tree based data signature, the method comprising:
   sending a keyless hash-tree based data signature associated with a data asset to a M2M or IoT device;
   splitting the keyless hash-tree based data signature into a first partial signature and a second partial signature, the first partial signature being smaller than the second partial signature, the splitting comprises splitting the keyless hash-tree based data signature using an indication specifying how to split the hash- tree based data signature;
   storing, in memory of the gateway device, the second partial signature for subsequent use in verifying integrity of the data asset; and
   using the first partial signature in a verification procedure towards the KSI system for verifying integrity of a data asset, the using comprising:
      requesting a second partial signature from the gateway device;
      assembling a data signature based on the first partial signature and the received second partial signature; and
      sending the assembled data signature in a verification request to the gateway device for conveyance to the KSI system.

7. The method of claim 6, further comprising, prior to the sending, receiving a data signature generation request from the M2M or IoT device, the request comprising an indication for a partial data signature.

8. The method of claim 6, further comprising:
receiving a request for the second partial signature from the M2M or IoT device; and sending the second partial signature to the M2M or IoT device.

9. A gateway device in a keyless signature infrastructure (KSI) system for providing a hash-tree based data signature to a machine-to-machine (M2M) device or Internet-Of-Things (IoT) device, the gateway device comprising:
processing circuitry;
memory containing instructions executable by the processing circuitry whereby the gateway device is configured to:
send a keyless hash-tree based data signature to the M2M or IoT device;
split the keyless hash-tree based data signature into a first partial signature and a second partial signature, the first partial signature is smaller than the second partial signature, the splitting comprises splitting the keyless hash-tree based data signature using an indication specifying how to split the hash-tree based data signature;
store, in memory of the gateway device, the second partial signature for subsequent use in verifying integrity of the data asset; and
use the first partial signature in a verification procedure towards the KSI system for verifying integrity of a data asset, the use comprising:
requesting a second partial signature from the gateway device;
assembling a data signature based on the first partial signature and the received second partial signature; and
sending the assembled data signature in a verification request to the gateway device for conveyance to the KSI system.

10. The gateway device of claim 9, wherein the instructions are such that the gateway device is operative to, prior to the sending, receive a data signature generation request from the M2M or IoT device, the request comprising an indication for a partial data signature.

\* \* \* \* \*